(12) United States Patent
Zhang et al.

(10) Patent No.: US 11,853,161 B2
(45) Date of Patent: Dec. 26, 2023

(54) IMAGE MODELS TO PREDICT MEMORY FAILURES IN COMPUTING SYSTEMS

(71) Applicant: Google LLC, Mountain View, CA (US)

(72) Inventors: Gufeng Zhang, San Jose, CA (US); Milad Olia Hashemi, San Francisco, CA (US); Ashish V. Naik, Los Altos, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/727,454

(22) Filed: Apr. 22, 2022

(65) Prior Publication Data

US 2023/0342245 A1    Oct. 26, 2023

(51) Int. Cl.
*G11C 29/00*    (2006.01)
*G06F 11/10*    (2006.01)
*G06F 11/07*    (2006.01)
*G06N 3/04*    (2023.01)
*G06F 18/214*   (2023.01)

(52) U.S. Cl.
CPC ........ *G06F 11/1068* (2013.01); *G06F 11/076* (2013.01); *G06F 11/0757* (2013.01); *G06F 11/0772* (2013.01); *G06F 18/214* (2023.01); *G06N 3/04* (2013.01)

(58) Field of Classification Search
CPC ............. G06F 11/1068; G06F 11/0772; G06F 11/076; G06F 11/0757; G06F 18/214; G06N 3/04
See application file for complete search history.

(56) References Cited

U.S. PATENT DOCUMENTS

| | | | |
|---|---|---|---|
| 2020/0209761 A1* | 7/2020 | Liebregts | G03F 7/70533 |
| 2022/0050603 A1 | 2/2022 | Zhou et al. | |
| 2022/0222138 A1* | 7/2022 | Park | G11C 16/0483 |
| 2023/0083193 A1* | 3/2023 | Zhou | G11C 29/52 |
| | | | 714/42 |

OTHER PUBLICATIONS

Extended European Search Report in European Appln. No. 22196132. 9, dated May 23, 2023, 8 pages.

* cited by examiner

*Primary Examiner* — Samir W Rizk
(74) *Attorney, Agent, or Firm* — Fish & Richardson P.C.

(57) ABSTRACT

Methods, systems and apparatus, including computer programs encoded on computer storage medium, for predicting a likelihood of a future computer memory failure. In one aspect training data inputs are obtained, where each training data input includes correctable memory error data that describes correctable errors that occurred in a computer memory and data indicating whether the correctable errors produced a failure of the computer memory. For each training data input, image representations of the correctable memory error data included in the training data input are generated. The image representations are processed using a machine learning model to output an estimated likelihood of a future failure of the computer memory. A difference between the estimated likelihood of the future failure of the computer memory and the data indicating whether the correctable errors produced a failure of the computer memory is computed. Values of model parameters are updated using the computed difference.

20 Claims, 6 Drawing Sheets

IMAGE MODELS TO PREDICT MEMORY FAILURES IN COMPUTING SYSTEMS

BACKGROUND

Hardware reliability in computing machines is challenging due to the increase in complexity in silicon manufacturing and computer systems. There are a variety of reasons that machines can fail, including memory failures. Memory failures can be correctable errors or uncorrectable errors. Correctable errors are memory errors that do not affect normal operation of the system and can be corrected, e.g., using error correction code mechanisms. Uncorrectable errors are memory errors that cannot be corrected. Uncorrectable memory errors are a major contributing factor to machine crashes or shutdowns, driving up the mean time between failures. In some cases patterns of correctable errors cannot be corrected by error correction codes and can evolve to uncorrectable errors.

Predictive failure analysis techniques include computer mechanisms that analyze trends in correctable errors to predict future failures and initiate operations to avoid the predicted failures. For example, high counts of corrected RAM intermittent errors by error correction codes can be predictive of future dual in-line memory module failures. Therefore, some operating systems can automatically remove memory pages showing excessive corrections from usage or processor cores showing excessive cache correctable memory errors to avoid memory or CPU failures.

SUMMARY

This specification describes systems and methods for predicting computer memory failures using image recognition machine learning techniques.

In general, one innovative aspect of the subject matter described in this specification may be embodied in methods that include the actions of receiving a log of correctable memory error data that describes correctable errors that occurred in a computer memory; generating, from the log of correctable memory error data, one or more image representations of the correctable memory error data; inputting the one or more image representations to a machine learning model, wherein the machine learning model is trained to predict a likelihood of a future failure of a computer memory from input image representations generated from a log of correctable memory error data that describes correctable errors that occurred in the computer memory; and receiving, from the machine learned model, a likelihood of the future failure based on the input of the one or more image representations.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus (e.g., one or more computers or computer processors), cause the apparatus to perform the actions.

The foregoing and other embodiments can each optionally include one or more of the following features, alone or in combination. In some implementations the one or more image representations of the correctable memory error data comprise one or more of: a parity syndrome image, the parity syndrome image representing one or more bursts of parity syndromes for respective correctable error addresses, or a correctable error address image, the correctable error address image representing one or more addresses of correctable memory errors.

In some implementations the parity syndrome image comprises a matrix, wherein i) columns of the matrix represent DQs, ii) rows of the matrix represent data bursts, and iii) shaded entries of the matrix represent flipped bits.

In some implementations the correctable error address image comprises a graph that displays values for two variables of the addresses of correctable memory errors as a collection of points.

In some implementations the one or more image representations of the correctable memory error data comprise a parity syndrome image, and wherein the machine learning model comprises a convolutional neural network.

In some implementations the method further comprises processing, by the machine learning model, the one or more image representations of the correctable memory error data, the processing comprising: processing, by a first convolutional neural network included in the machine learning model, a correctable error address image to obtain a first convolutional neural network output; processing, by a second convolutional neural network included in the machine learning model, a parity syndrome image to obtain a second convolutional neural network output; concatenating the first convolutional neural network output and the second convolutional neural network output to obtain a combined data input; and processing, by a feed forward neural network included in the machine learning model, the combined data input to obtain an output representing the likelihood of a future failure.

In some implementations the method further comprises determining whether the received likelihood of a future failure exceeds a predetermined threshold; and in response to determining that the likelihood a future failure exceeds the predetermined threshold, initiating a failure mitigation operation, the failure mitigation operation comprising one or more of job migration or memory replacement.

In some implementations the log of correctable memory error data comprises data representing correctable memory errors that occurred in the computer memory a predetermined time interval.

In some implementations the correctable memory error data comprises, for each correctable memory error that occurred in the predetermined time interval: a corresponding memory error address, the address comprising one or more of channel, DIMM number, rank, device, bank, row, column, and a corresponding parity syndrome.

In some implementations the correctable errors comprise row failures, column failures, bank failure, or multi-bit failures.

In general, another innovative aspect of the subject matter described in this specification may be embodied in methods for training a machine learning model to predict computer memory failures, the methods including the actions of: obtaining multiple training data inputs, wherein each training data input comprises i) correctable memory error data that describes correctable errors that occurred in a computer memory and ii) data indicating whether the correctable errors produced a failure of the computer memory; for each training data input: generating one or more image representations of the correctable memory error data included in the training data input; processing the one or more image representations using the machine learning model to output an estimated likelihood of a future failure of the computer memory; computing a difference between the estimated likelihood of the future failure of the computer memory and the data indicating whether the correctable errors produced a failure of the computer memory included in the training data input; and updating values of parameters of the machine learning model using the computed difference.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus (e.g., one or more computers or computer processors), cause the apparatus to perform the actions.

The foregoing and other embodiments can each optionally include one or more of the following features, alone or in combination. In some implementations the one or more image representations comprise one or more of: a parity syndrome image, the parity syndrome image representing one or more bursts of parity syndromes for respective correctable error addresses, or a correctable error address image, the correctable error address image representing one or more addresses of correctable memory errors.

In some implementations the parity syndrome image comprises a matrix, wherein i) columns of the matrix represent DQs, ii) rows of the matrix represent data bursts, and iii) shaded entries of the matrix represent flipped bits.

In some implementations the correctable error address image comprises a graph that displays values for two variables of the addresses of correctable memory errors as a collection of points.

In some implementations the one or more image representations of the correctable memory error data comprise a parity syndrome image, and wherein the machine learning model comprises a convolutional neural network.

In some implementations processing the one or more image representation using the machine learning model comprises: processing, by a first convolutional neural network included in the machine learning model, a correctable error address image to obtain a first convolutional neural network output; processing, by a second convolutional neural network included in the machine learning model, a parity syndrome image to obtain a second convolutional neural network output; concatenating the first convolutional neural network output and the second convolutional neural network output to obtain a combined data input; and processing, by a feed forward neural network included in the machine learning model, the combined data input to obtain an output representing an estimated likelihood of a future computer memory failure of the computer memory.

Some implementations of the subject matter described herein may realize, in certain instances, one or more of the following advantages.

A system implementing the presently described techniques analyzes patterns of correctable errors and uses results of the analysis to predict and mitigate uncorrectable errors. Accordingly, memory reliability can be improved. In addition, since correctable error patterns are strong signals of the occurrence of uncorrectable errors, the predictions generated by the system can be more accurate, e.g., compared to systems that predict the occurrence of uncorrectable errors using other techniques such as analysis of historical correctable data.

In addition, the presently described techniques can be used to detect adversarial attacks. For example, some attackers use repetitive patterns of memory events and errors to cause bit flips, e.g., like the row hammer effect. The presently described techniques can be trained on appropriate training data to detect such repetitive patterns.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements.

DETAILED DESCRIPTION

This specification describes systems and methods for predicting memory failures in computer systems using image recognition machine learning techniques.

Figure 1:
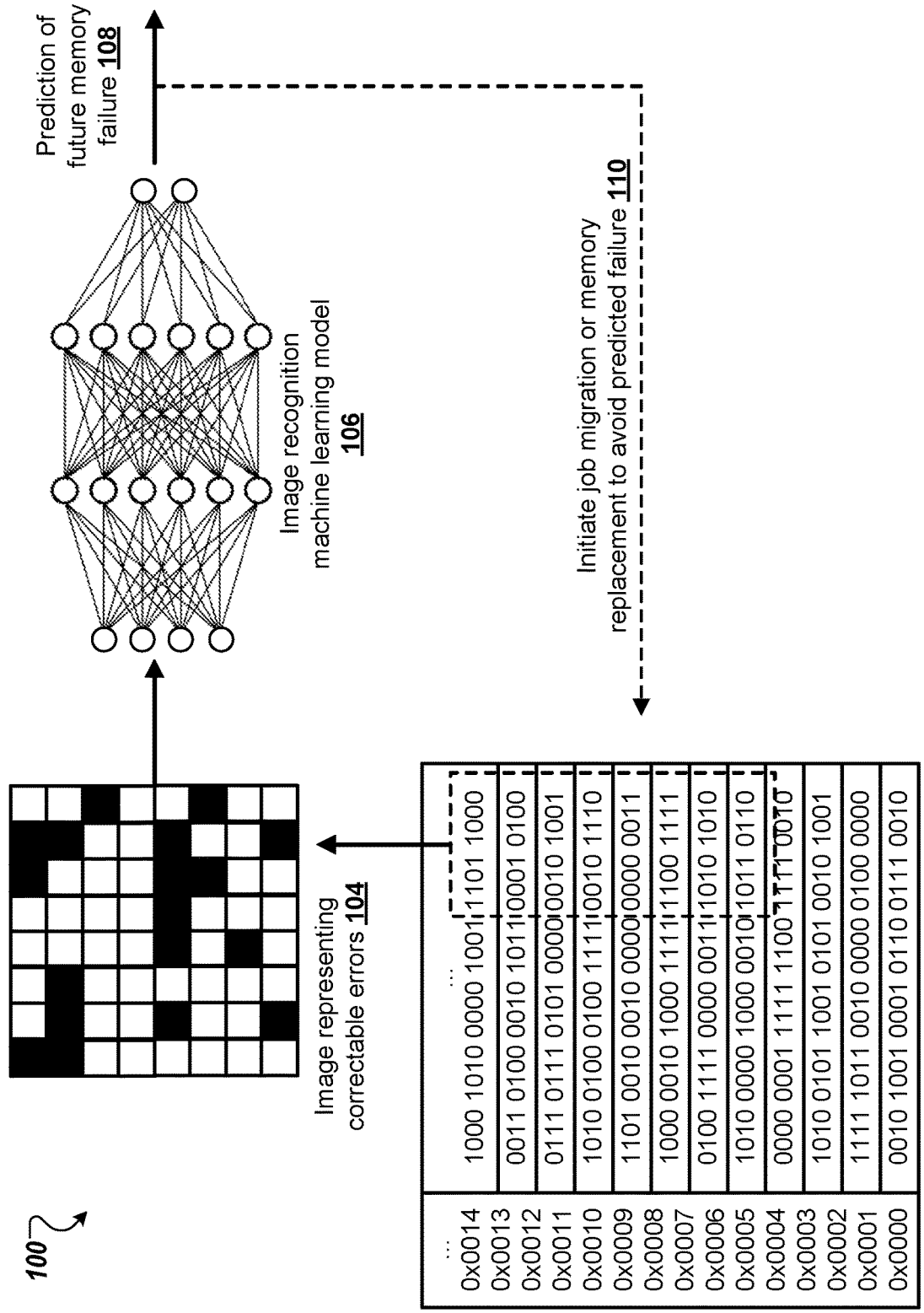
FIG. 1 is a conceptual diagram of predicting computer memory failures using images representing correctable memory errors.

FIG. 1 is a conceptual diagram 100 of predicting computer memory failures using images representing correctable memory errors. Data representing correctable errors occurring in a computer memory 102 are sampled and stored. Images, e.g., image 104, are generated using the sampled correctable memory error data. The images represent an operating state of the computer memory 102 at the time the correctable memory error data was sampled. The images can include matrix codes representing correctable error addresses or parity syndromes of a correctable error. The images are processed using a trained machine learning model 106 to predict a likelihood of a future computer memory failure 108. If a future computer memory failure is likely, actions 110 such as job migration or memory replacement can be implemented to avoid memory failure.

Figure 2:
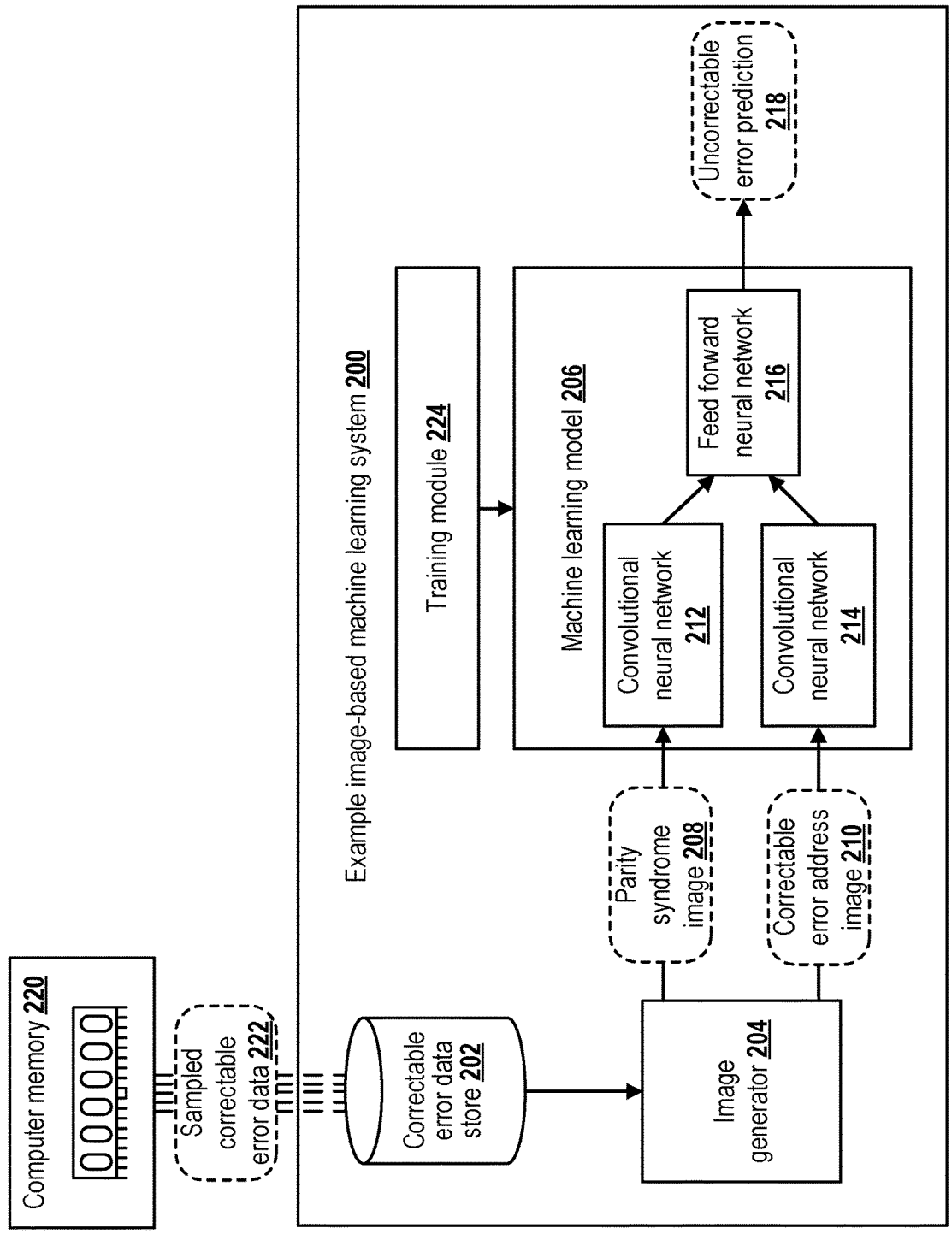
FIG. 2 is a block diagram of an example system for predicting computer memory failures using image-based machine learning.

FIG. 2 is a block diagram of an example image-based machine learning system 200. The example system 200 can be trained to predict computer memory failures using correctable memory error data. The example system 200 includes a correctable error data store 202, an image generator 204, a machine learning model 206, and a training module 224. The example system 200 is in data communication with a physical computer memory 220. The correctable error data store 202, image generator 204, machine learning model 206, training module 224, and computer memory 220 can be connected via a network, e.g., a local area network (LAN), wide area network (WLAN), the Internet, or a combination thereof, which can be accessed over a wired and/or a wireless communications link.

The correctable error data store 202 stores information relating to correctable memory errors occurring in the computer memory 220. For example, the system 200 can poll a computer memory 220 and store information relating to detected correctable errors, e.g., sampled correctable error data 222. Example correctable errors include row failures, column failures, bank failure, or multi-bit failures. The system 200 can poll the computer memory 220 at a polling frequency set by the computer's operating system. Accordingly, in some implementations, information relating to only a sample of correctable errors occurring in the computer memory 220 are logged in the correctable error data store 202. The stored information can include error addresses, e.g., channel, DIMM number, rank, device, bank, row, and column, and parity syndromes, e.g., information specifying which bits are flipped.

The image generator 204 is configured to convert correctable error data stored in the correctable error data store 202 to images that represent the correctable error data. In some implementations the image generator 204 can convert one sample of correctable error data to images. These images represent the state of the computer memory 220 at the time the correctable error data was sampled. In other implementations the image generator 204 can convert multiple samples of correctable error data to images that represent the state of the computer memory 220 over a longer time period.

The type of images generated by the image generator 204 is dependent on the data stored in the correctable error data store 202 and the task that the machine learning model 206 is trained to perform. For example, as described below with reference to FIG. 3, in some implementations the image generator 204 can be configured to generate correctable error address images and parity syndrome images.

The machine learning model 206 is configured, through training, to process images received from the image generator 204, e.g., parity syndrome image 208 and/or correctable error address image 210, and generate an output representing a likelihood that the computer memory 220 will fail due to an uncorrectable error, e.g., uncorrectable error prediction 218. The machine learning model 206 can include parameters which can be adjusted to trained values to improve the accuracy of outputs generated by the machine learning model 206, as described below with reference to FIG. 5.

In some implementations the machine learning model 206 can be configured to process one type of image, e.g., parity syndrome images. For example, the machine learning model 206 can include a neural network, e.g., a convolutional neural network, that can be configured through training to process parity syndrome images. In other implementations the machine learning model 206 can be configured to process multiple types of images, e.g., parity syndrome images and correctable error address images. For example, as shown in FIG. 2, the machine learning model 206 can include a first neural network, e.g., convolutional neural network 212, that can be configured to process a first type of image, e.g., parity syndrome images 208. The machine learning model 206 can also include a second neural network, e.g., convolutional neural network 214, that can be configured to process a second type of image, e.g., correctable error address images 210. Outputs from the first neural network and second neural network can be combined, e.g., using an attention mechanism that concatenates the outputs, and provided as input to a third neural network, e.g., feed forward neural network 216.

In some implementations, the machine learning model can include one or more temporal neural networks, e.g., temporal convolutional neural networks, that can be configured through training to process sequences of images, e.g., corresponding to sequentially sampled correctable error data.

The training module 224 is configured to implement algorithms for training the machine learning model 206. For example, the training module 224 can implement backpropagation algorithms by computing a gradient of a loss function with respect to the parameters (weights) of the machine learning model 206. During training, the training module 224 can compute differences between training data inputs and corresponding predictions output by the machine learning model 206 and use the computed differences as a loss to train the machine learning model 206. The training module 224 can also be configured to determine whether training termination criteria are satisfied or not and terminate a training process if the criteria are met. The system 200 can provide uncorrectable error predictions 218 output by the machine learning model 206, e.g., to a broker, to initiate actions that can mitigate the occurrence of uncorrectable memory errors. For example, the system 200 can be configured to determine whether the value of an uncorrectable error prediction exceeds a predetermined threshold, e.g., a threshold set by an operator of the computer in which the computer memory 220 is located. In response to determining that a value of an uncorrectable error prediction exceeds the predetermined threshold, the system 200 can send an alert to the computer or otherwise cause initiation of an action such as job migration or memory replacement.

Figure 3:
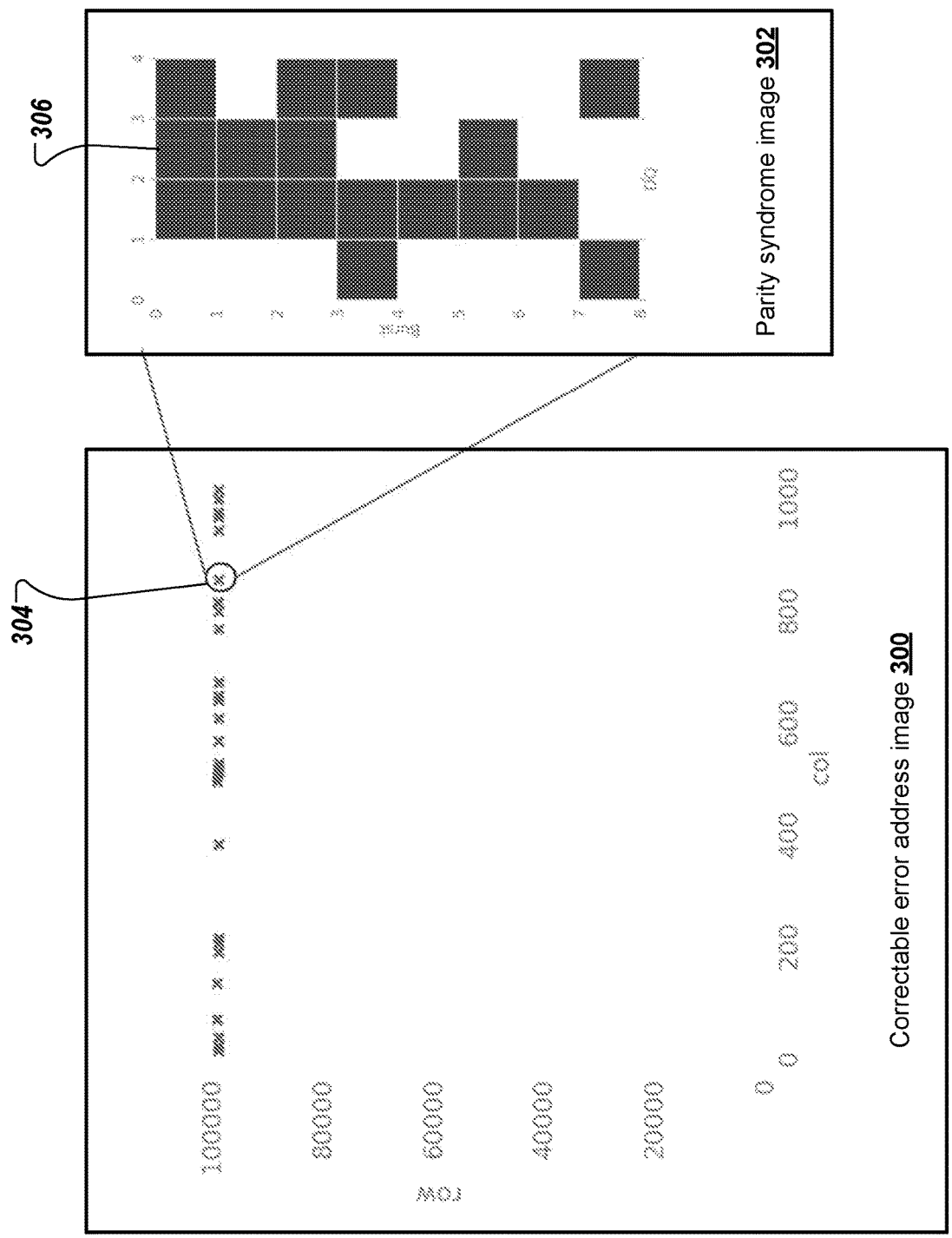
FIG. 3 shows an example correctable error address image and an example parity syndrome image.

FIG. 3 shows an example correctable error address image 300 and an example parity syndrome image 302. The correctable error address image 300 and parity syndrome image 302 are images that can be generated by the image generator 204 described above with reference to FIG. 2.

The example correctable error address image 300 is a graph. The x-axis of the graph represents column addresses and the y-axis of the graph represents row addresses. Addresses of correctable errors occurring in the computer memory are displayed as a collection of crosses, e.g., cross 304 indicates that a correctable error occurred at row 98000 and column 860. The correctable error address image 300 shows a typical pattern of row failure in a computer memory, where correctable memory errors occur in a same row address but different column addresses.

Each correctable error shown in the correctable error address image 300 corresponds to a respective parity syndrome for the correctable error. The parity syndrome indicates how many bits are flipped. The example parity syndrome image 302 is a matrix representation of the parity syndrome for correctable error 304. Columns of the matrix represent DQs (data pins in double data rate (DDR) circuitry that represent the transmission granularity of data on the DDR memory bus) and rows of the matrix represent data bursts. Bits that were flipped are shaded, e.g., shaded matrix entry 306 indicates that the bit in the third burst at DQ 1 was flipped. The parity syndrome image 302 for correctable error 304 shows the multi-bit error: 17 bits were flipped out of 32 bits in total.

Figure 4:
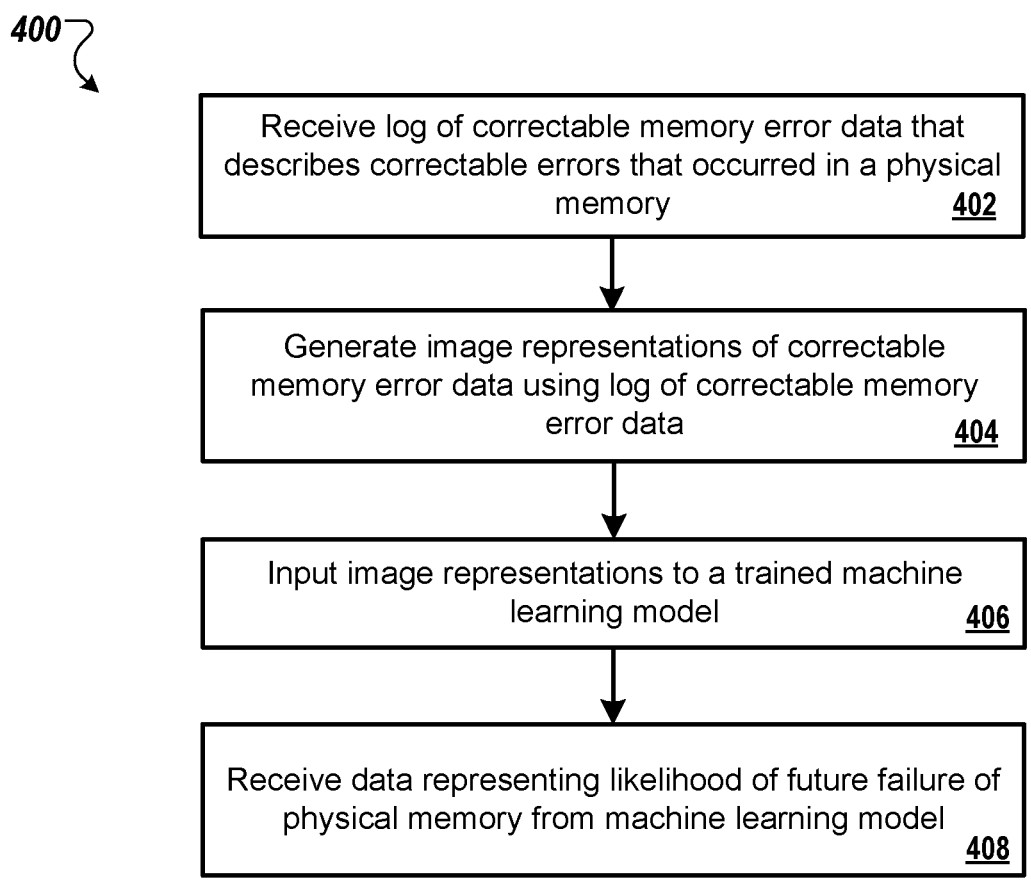
FIG. 4 is a flow chart of an example process for predicting a likelihood of a future computer memory failure.

FIG. 4 is a flow chart of an example process 400 for predicting a likelihood of a future failure of a computer memory. For convenience, the process 400 will be described as being performed by a system of one or more computers located in one or more locations. For example, a computing system, e.g., the computing system 200 of FIG. 2, appropriately programmed, can perform example process 400.

The system receives a log of correctable memory error data that describes correctable errors that occurred in a computer memory (step 402). The correctable memory error data stored in the log can include data representing correctable memory errors that occurred in the computer memory during a predetermined time interval, e.g., at a particular instance of time or over a longer period of time. The logged correctable memory error data can include, for each correctable memory error that occurred in the predetermined time interval: a corresponding memory error address, e.g., one or more of channel, DIMM number, rank, device, bank, row, column, and a corresponding parity syndrome.

The system generates one or more image representations of the correctable memory error data (step 404). The generated image representations provide a visualization of patterns of errors that occurred in the computer memory. The system can generate different types of image representations. In some implementations the system can generate a parity syndrome image using parity syndrome data corresponding to respective correctable memory error addresses, as described above with reference to FIG. 3. For example, the system can convert parity syndromes for a respective correctable memory error address to an image representation by constructing a matrix, where columns of the matrix represent DQs and rows of the matrix represent data bursts. The system can then shade entries of the matrix to represent flipped bits (as indicated by the parity syndrome data). The resulting parity syndrome image is therefore a matrix 2D code.

Alternatively or in addition, in some implementations the system can generate a correctable error address image using data corresponding to addresses of correctable memory errors, as described above with reference to FIG. 3. For example, the system can convert addresses of correctable memory errors to an image representation by constructing a graph that displays values for two variables of the memory error address, e.g., memory row and memory column, as a collection of points. The resulting correctable error address image can therefore be a scatter plot or scatter plot matrix. In some implementations the system can generate multiple correctable error address images using a same sample of correctable memory error data, e.g., corresponding to various combinations of the variables of the memory error address (channel, DIMM number, rank, device, bank, row, column).

The system inputs the one or more image representations generated at step 404 to a machine learning model (step 406). The machine learning model is a model that has been trained to predict likelihoods of future failures of computer memories from input image representations that have been generated from logs of correctable memory error data, e.g., using example process 500 of FIG. 5.

In some implementations the machine learning model can include a convolutional neural network that has been trained to process one type of image, e.g., parity syndrome images, to output a value that represents a likelihood of a future failure. In these implementations the system can process the one or more image representations using the convolutional neural network. In other implementations the machine learning model can include multiple convolutional neural networks that have each been trained to process a respective type of image, e.g., parity syndrome images or correctable error address images, to generate an output that represents a likelihood of a future failure. In these implementations the system can process a first type of image, e.g., a correctable error address image, using a first convolutional neural network included in the machine learning model and process a second type of image, e.g., a parity syndrome image, using a second convolutional neural network included in the machine learning model. The system can then concatenate a first convolutional neural network output and a second convolutional neural network output to obtain a combined data input and process the combined data input using a feed forward neural network included in the machine learning model to obtain an output representing the likelihood of a future failure.

The system receives a likelihood of a future failure of the computer memory from the machine learning model (step 408). In some implementations the system can determine whether the likelihood of a future failure exceeds a predetermined threshold or not. In response to determining that the likelihood a future failure exceeds a predetermined threshold, the system can initiate an appropriate failure mitigation operation. For example, the system can perform job migration or initiate computer memory replacement.

In some implementations example process 400 can be used to detect an adversarial attack on the computer memory. Attackers can use repetitive patterns of memory events and errors to cause bit flips (like row hammer), potentially leading to adversarial attacks. In some implementations the machine learning model can be trained to predict likelihoods of such attacks from input image representations that have been generated from correctable memory error data that includes such repetitive patterns. The system can then receive a likelihood that an adversarial attack on the computer memory has or will take place from the machine learning model.

Figure 5:
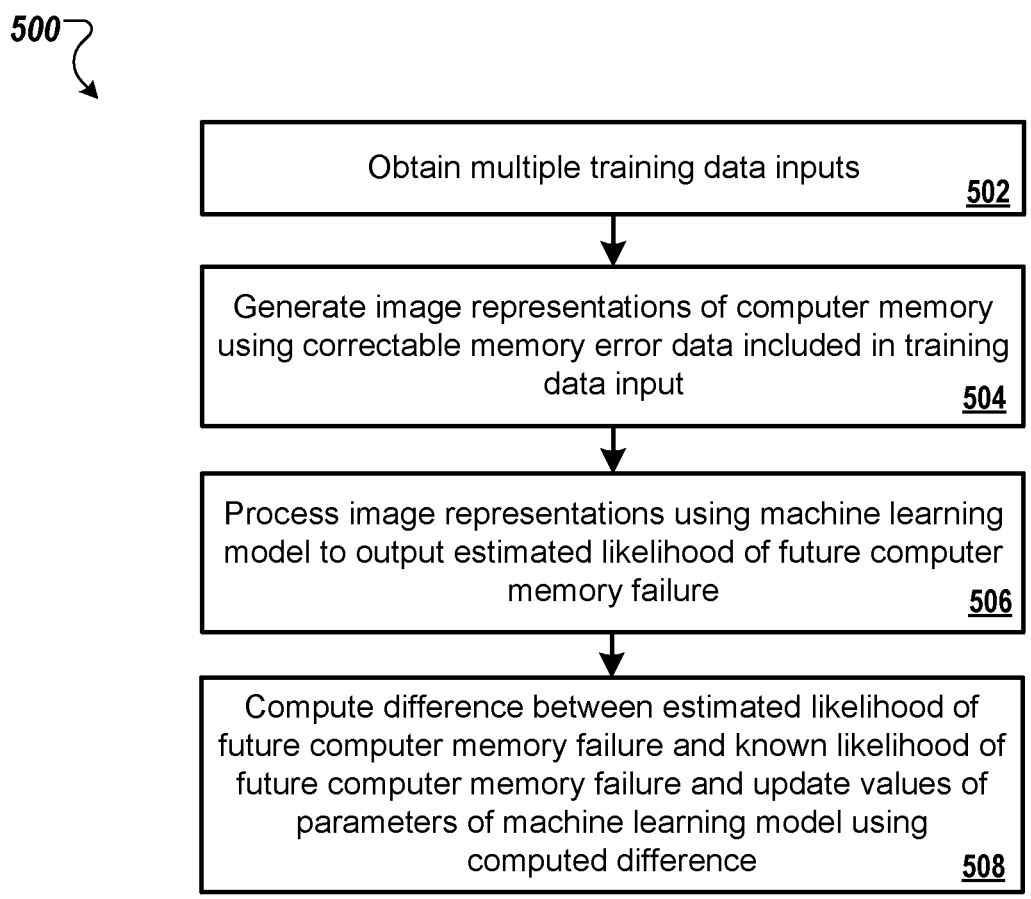
FIG. 5 is a flowchart of an example process for training a machine learning model on multiple training data inputs to predict computer memory failures.

FIG. 5 is a flowchart of an example process 500 for training a machine learning model on multiple training data inputs to predict computer memory failures. For convenience, the process 500 will be described as being performed by a system of one or more computers located in one or more locations. For example, a computing system, e.g., the computing system 200 of FIG. 2, appropriately programmed, can perform example process 500.

The system obtains multiple training data inputs (step 502). Each training data input can include data representing correctable memory errors that occurred in a physical computer memory during a predetermined time interval, e.g., at a particular instance or over a longer period of time. Each training data input can also include data indicating whether the correctable memory errors produced (or resulted in) a failure of the computer memory, e.g., data representing a known likelihood that the correctable memory errors lead to an uncorrectable memory error.

To train the machine learning model on the multiple training data inputs, the system performs the below described steps 504-508 for each training data input.

The system generates one or more image representations of the correctable memory error data included in the training data input (step 504). Step 506 is similar to step 404 of example process 400 described above with reference to FIG. 4. For brevity, details are not repeated.

The system processes the one or more image representations using the machine learning model to output an estimated likelihood of a future failure of the computer memory (step 506). Step 506 is similar to steps 406 and 408 of example process 400 described above with reference to FIG. 4. For brevity, details are not repeated.

The system computes a difference between the estimated likelihood of the future failure of the computer memory and the known likelihood of a future failure included in the training data input (step 508). The system then updates the values of parameters of the machine learning model using the computed difference. For example, the system can use the computed difference as a loss and determine updated values of the parameters of the machine learning model by backpropagating loss gradients through the machine learning model.

The system can iteratively perform steps 504-508 over multiple epochs until each of the multiple training data inputs have been processed, until a loss threshold is met, or until changes between epochs show no improvement. For example, in some implementations after step 508 the system can determine whether the computed difference between the estimated likelihood of a future failure and the known likelihood of a future failure meets a predetermined loss threshold and in response to determining that the computed difference meets the predetermined loss threshold, terminate the training of the machine learning model. In response to determining that the computed difference does not meet the predetermined loss threshold, the system can perform another iteration and process a new training data input.

As another example, in some implementations, after step 508, the system can determine whether the computed difference between the estimated likelihood of a future failure and the known likelihood of a future failure has converged to within a predetermined convergence threshold and in response to determining that the computed difference has converged to within the predetermined convergence threshold, terminate the training of the machine learning model. In response to determining that the computed difference has not converged to within the predetermined convergence threshold, the system can perform another iteration and process a new training data input.

Once trained, the machine learning model can be provided to predict a likelihood of a future failure of a computer memory, as described above with reference to FIG. 4.

As described above, in some implementations example process 500 can be used to train a machine learning model to detect an adversarial attack on a computer memory. In these implementations the training data inputs can include typical patterns of memory events and errors that adversaries are known to use. That is, the training data inputs can include data representing correctable memory errors that occurred in a physical computer memory and data indicating whether the correctable memory errors represented an adversarial attack on the computer memory, e.g., data representing a known likelihood that the correctable memory errors were part of an adversarial attack.

Figure 6:
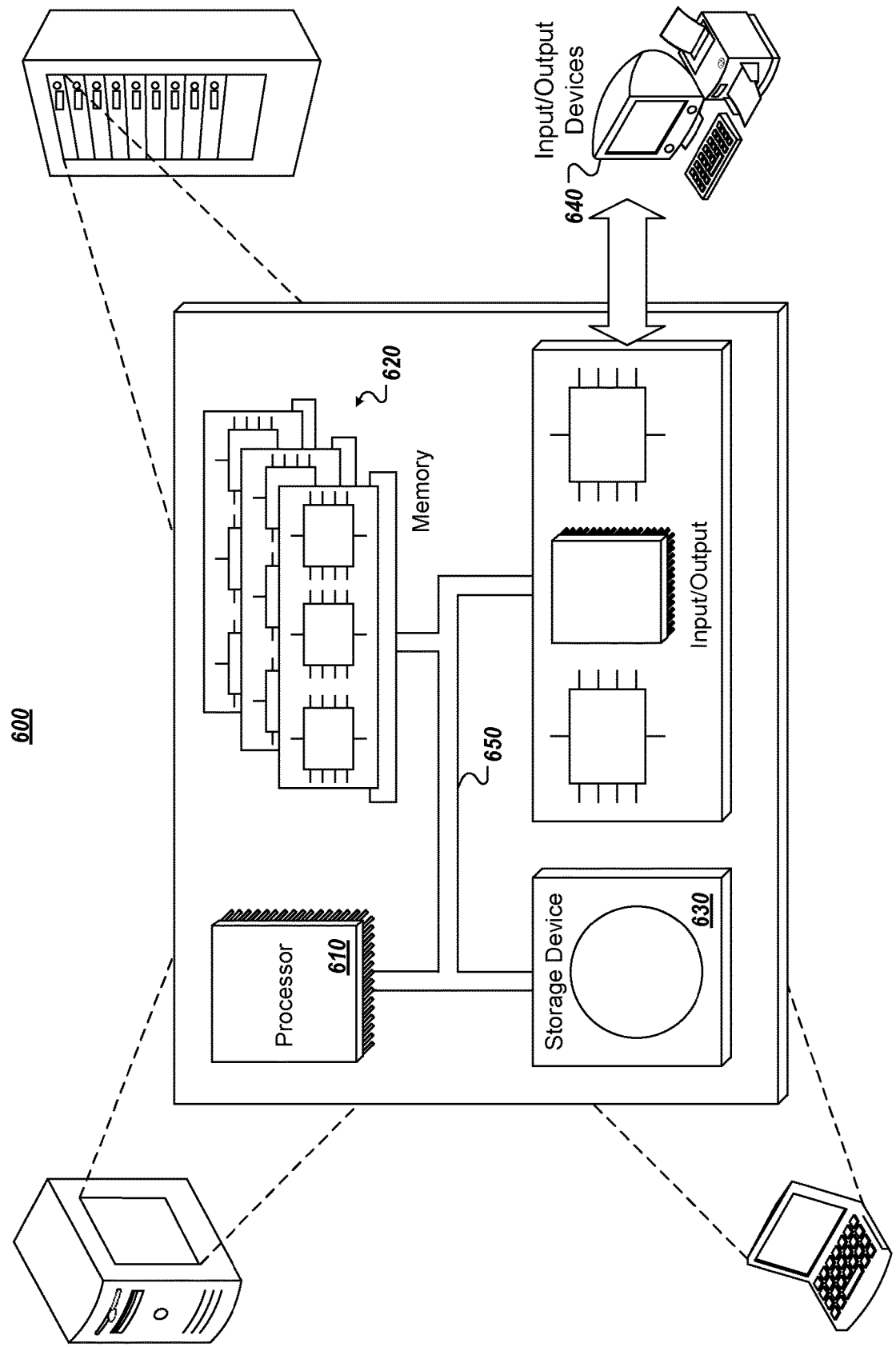
FIG. 6 is a schematic diagram of an exemplary computer system.

FIG. 6 is a schematic diagram of an exemplary computer system 600. The system 600 can be used for the operations described in association with the processes 400 and 500 described above according to some implementations. The system 600 is intended to represent various forms of digital computers, such as laptops, desktops, workstations, personal digital assistants, servers, blade servers, mainframes, mobile devices and other appropriate computers. The components shown here, their connections and relationships, and their functions, are exemplary only, and do not limit implementations of the inventions described and/or claimed in this document.

The system 600 includes a processor 610, a memory 620, a storage device 630, and an input/output device 640. Each of the components 610, 620, 630, and 640 are interconnected using a system bus 650. The processor 610 may be enabled for processing instructions for execution within the system 600. In one implementation, the processor 610 is a single-threaded processor. In another implementation, the processor 610 is a multi-threaded processor. The processor 610 may be enabled for processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 may be enabled for providing mass storage for the system 600. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments have been described. Other embodiments are within the scope of the following claims. For example, the actions recited in the claims may be performed in a different order and still achieve desirable results.

What is claimed is:

1. A computer-implemented comprising:
   receiving a log of correctable memory error data that describes correctable errors that occurred in a computer memory;
   generating, from the log of correctable memory error data, one or more image representations of the correctable memory error data, wherein the one or more image representations are generated by converting the correctable memory error data to matrix codes or graphs that provide visualizations of patterns of errors that occurred in the computer memory;
   inputting the one or more image representations to an image recognition machine learning model, wherein the image recognition machine learning model is trained to predict a likelihood of a future failure of a computer memory from input image representations generated by converting a log of correctable memory error data that describes correctable errors that occurred in the computer memory to matrix codes or graphs that provide visualizations of patterns of errors that occurred in the computer memory; and
   receiving, from the image recognition machine learned model, a likelihood of the future failure based on the input of the one or more image representations.

2. The method of claim 1, wherein the one or more image representations of the correctable memory error data comprise one or more of:
- a parity syndrome image, the parity syndrome image generated by converting the correctable memory data to an image that represents one or more bursts of parity syndromes for respective correctable error addresses, or
- a correctable error address image, the correctable error address image generated by converting the correctable memory data to an image that represents one or more addresses of correctable memory errors.

3. The method of claim 2, wherein the parity syndrome image comprises a matrix, wherein i) columns of the matrix represent DQs, ii) rows of the matrix represent data bursts, and iii) shaded entries of the matrix represent flipped bits.

4. The method of claim 2, wherein the correctable error address image comprises a graph that displays values for two variables of the addresses of correctable memory errors as a collection of points.

5. The method of claim 1, wherein the one or more image representations of the correctable memory error data comprise a parity syndrome image, and wherein the image recognition machine learning model comprises a convolutional neural network.

6. The method of claim 1, further comprising processing, by the image recognition machine learning model, the one or more image representations of the correctable memory error data, the processing comprising:
- processing, by a first convolutional neural network included in the image recognition machine learning model, a correctable error address image to obtain a first convolutional neural network output;
- processing, by a second convolutional neural network included in the image recognition machine learning model, a parity syndrome image to obtain a second convolutional neural network output;
- concatenating the first convolutional neural network output and the second convolutional neural network output to obtain a combined data input; and
- processing, by a feed forward neural network included in the image recognition machine learning model, the combined data input to obtain an output representing the likelihood of a future failure.

7. The method of claim 1, further comprising:
- determining whether the received likelihood of a future failure exceeds a predetermined threshold; and
- in response to determining that the likelihood a future failure exceeds the predetermined threshold, initiating a failure mitigation operation, the failure mitigation operation comprising one or more of job migration or memory replacement.

8. The method of claim 1, wherein the log of correctable memory error data comprises data representing correctable memory errors that occurred in the computer memory a predetermined time interval.

9. The method of claim 8, wherein the correctable memory error data comprises, for each correctable memory error that occurred in the predetermined time interval:
- a corresponding memory error address, the address comprising one or more of channel, DIMM number, rank, device, bank, row, column, and
- a corresponding parity syndrome.

10. The method of claim 1, wherein the correctable errors comprise row failures, column failures, bank failure, or multi-bit failures.

11. A computer implemented method for training an image recognition machine learning model to predict computer memory failures, the method comprising:
- obtaining multiple training data inputs, wherein each training data input comprises i) correctable memory error data that describes correctable errors that occurred in a computer memory and ii) data indicating whether the correctable errors produced a failure of the computer memory;
- for each training data input:
  - generating one or more image representations of the correctable memory error data included in the training data input, wherein the one or more image representations are generated by converting the correctable memory error data to matrix codes or graphs that provide visualizations of patterns of errors that occurred in the computer memory;
  - processing the one or more image representations using the image recognition machine learning model to output an estimated likelihood of a future failure of the computer memory;
  - computing a difference between the estimated likelihood of the future failure of the computer memory and the data indicating whether the correctable errors produced a failure of the computer memory included in the training data input; and
  - updating values of parameters of the image recognition machine learning model using the computed difference.

12. The method of claim 11, wherein the one or more image representations comprise one or more of:
- a parity syndrome image, the parity syndrome image generated by converting the correctable memory data to an image that represents one or more bursts of parity syndromes for respective correctable error addresses, or
- a correctable error address image, the correctable error address image generated by converting the correctable memory data to an image that represents one or more addresses of correctable memory errors.

13. The method of claim 12, wherein the parity syndrome image comprises a matrix, wherein i) columns of the matrix represent DQs, ii) rows of the matrix represent data bursts, and iii) shaded entries of the matrix represent flipped bits.

14. The method of claim 12, wherein the correctable error address image comprises a graph that displays values for two variables of the addresses of correctable memory errors as a collection of points.

15. The method of claim 11, wherein the one or more image representations of the correctable memory error data comprise a parity syndrome image, and wherein the image recognition machine learning model comprises a convolutional neural network.

16. The method of claim 11, wherein processing the one or more image representation using the image recognition machine learning model comprises:
- processing, by a first convolutional neural network included in the image recognition machine learning model, a correctable error address image to obtain a first convolutional neural network output;
- processing, by a second convolutional neural network included in the image recognition machine learning model, a parity syndrome image to obtain a second convolutional neural network output;
- concatenating the first convolutional neural network output and the second convolutional neural network output to obtain a combined data input; and processing, by a feed forward neural network included in the image recognition machine learning model, the combined data input to obtain an output representing an estimated likelihood of a future computer memory failure of the computer memory.

17. A system comprising one or more computers and one or more storage devices storing instructions that are operable, when executed by the one or more computers, to cause the one or more computers to perform operations comprising:
receiving a log of correctable memory error data that describes correctable errors that occurred in a computer memory;
generating, from the log of correctable memory error data, one or more image representations of the correctable memory error data, wherein the one or more image representations are generated by converting the correctable memory error data to matrix codes or graphs that provide visualizations of patterns of errors that occurred in the computer memory;
inputting the one or more image representations to an image recognition machine learning model, wherein the image recognition machine learning model is trained to predict a likelihood of a future failure of a computer memory from input image representations generated by converting a log of correctable memory error data that describes correctable errors that occurred in the computer memory; and
receiving, from the machine learned model, a likelihood of the future failure based on the input of the one or more image representations.

18. A non-transitory computer-readable storage medium comprising instructions stored thereon that are executable by a processing device and upon such execution cause the processing device to perform operations comprising:
receiving a log of correctable memory error data that describes correctable errors that occurred in a computer memory;
generating, from the log of correctable memory error data, one or more image representations of the correctable memory error data, wherein the one or more image representations are generated by converting the correctable memory error data to matrix codes or graphs that provide visualizations of patterns of errors that occurred in the computer memory;
inputting the one or more image representations to an image recognition machine learning model, wherein the image recognition machine learning model is trained to predict a likelihood of a future failure of a computer memory from input image representations generated by converting a log of correctable memory error data that describes correctable errors that occurred in the computer memory; and
receiving, from the machine learned model, a likelihood of the future failure based on the input of the one or more image representations.

19. A system comprising one or more computers and one or more storage devices storing instructions that are operable, when executed by the one or more computers, to cause the one or more computers to perform operations for training an image recognition machine learning model to predict computer memory failures, the operations comprising:
obtaining multiple training data inputs, wherein each training data input comprises i) correctable memory error data that describes correctable errors that occurred in a computer memory and ii) data indicating whether the correctable errors produced a failure of the computer memory;
for each training data input:
generating one or more image representations of the correctable memory error data included in the training data input, wherein the one or more image representations are generated by converting the correctable memory error data to matrix codes or graphs that provide visualizations of patterns of errors that occurred in the computer memory;
processing the one or more image representations using the image recognition machine learning model to output an estimated likelihood of a future failure of the computer memory;
computing a difference between the estimated likelihood of the future failure of the computer memory and the data indicating whether the correctable errors produced a failure of the computer memory included in the training data input; and
updating values of parameters of the image recognition machine learning model using the computed difference.

20. A non-transitory computer-readable storage medium comprising instructions stored thereon that are executable by a processing device and upon such execution cause the processing device to perform operations for training an image recognition machine learning model to predict computer memory failures, the operations comprising:
obtaining multiple training data inputs, wherein each training data input comprises i) correctable memory error data that describes correctable errors that occurred in a computer memory and ii) data indicating whether the correctable errors produced a failure of the computer memory;
for each training data input:
generating one or more image representations of the correctable memory error data included in the training data input, wherein the one or more image representations are generated by converting the correctable memory error data to matrix codes or graphs that provide visualizations of patterns of errors that occurred in the computer memory;
processing the one or more image representations using the image recognition machine learning model to output an estimated likelihood of a future failure of the computer memory;
computing a difference between the estimated likelihood of the future failure of the computer memory and the data indicating whether the correctable errors produced a failure of the computer memory included in the training data input; and
updating values of parameters of the image recognition machine learning model using the computed difference.

* * * * *